United States Patent [19]

Fecher

[11] Patent Number: 4,917,000
[45] Date of Patent: Apr. 17, 1990

[54] ADJUSTABLE RETURN SPRING FOR A PUSH ROD

[75] Inventor: Douglas A. Fecher, Granger, Ind.

[73] Assignee: Allied-Signal Inc., Morristown, N.J.

[21] Appl. No.: 168,037

[22] Filed: Mar. 14, 1988

[51] Int. Cl.$^4$ ................................................ F15B 9/12
[52] U.S. Cl. .................................. 91/369.2; 91/376 R; 91/372; 91/386
[58] Field of Search ................ 91/369.1, 369.2, 369.3, 91/369.4, 376 R, 372, 386; 92/133; 60/552, 554

[56] References Cited

U.S. PATENT DOCUMENTS

| | | | |
|---|---|---|---|
| 2,799,140 | 7/1957 | Osborne | 60/552 X |
| 3,364,818 | 1/1968 | Hager et al. | 91/376 X |
| 3,572,219 | 3/1971 | Murrell et al. | 92/133 |
| 3,613,520 | 10/1971 | Worden | 92/133 |
| 3,618,321 | 11/1971 | Moran | 60/552 X |
| 4,784,038 | 11/1988 | Guatier | 91/369.2 |

FOREIGN PATENT DOCUMENTS 3205268  8/1983  Fed. Rep. of Germany ..... 91/369.4

Primary Examiner—Edward K. Look
Attorney, Agent, or Firm—Leo H. McCormick, Jr.; Ken C. Decker

[57] ABSTRACT

A vacuum brake booster (12) having an input force applied to a brake pedal (20) for moving a plunger (28) to operate a control valve (24). A sleeve (98) concentric to the push rod (22) is located between the brake pedal (20) and plunger (28). A spring (94) acts on the sleeve (98) to move the plunger (28) against a stop (76) in the absence of an input force. A ramp (104) on sleeve (98) cooperates with projection (102) on said push rod (22) to define a linear dimension for the spring (94). Rotation of the sleeve (98) changes the load of the spring (94) and correspondingly the force required to initiate the operation of the control valve (24) through movement of the plunger (28).

5 Claims, 2 Drawing Sheets

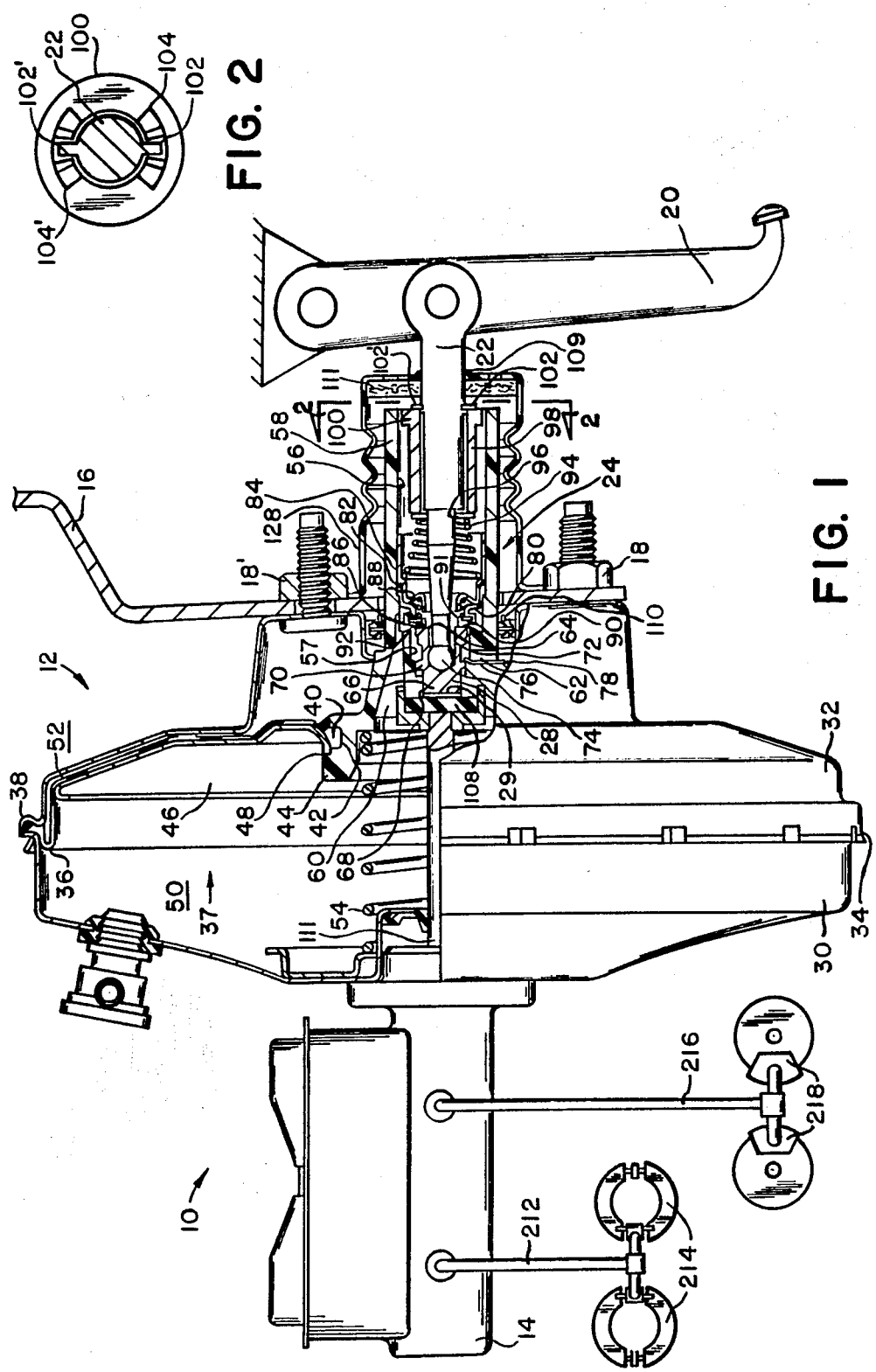

ADJUSTABLE RETURN SPRING FOR A PUSH ROD

This invention relates to an adjustable control for varying the force required by an input to operate a control valve in a vacuum brake booster.

Vacuum brake boosters are designed for vehicles and are sized according to an assigned fixed weight of a vehicle and occupants. This assigned fixed weight is factored into formula for designing brakes which meet and exceed standards set by the department of transportation for braking. The optimum effort required to initiate actuation of a control valve can vary if this fixed weight should change as in the case of a pick up truck from empty to loaded since two drivers react exactly the same with respect to braking changes in load conditions.

It has been discovered that by changing the load of the return spring for a push rod through which the input force from a brake pedal is transferred to a control valve to changes in load condition of a vehicle, brake actuation can be substantially standardized.

In the invention disclosed herein, a sleeve member is located on the input push rod between the return spring and an adjustment mechanism. The adjustment mechanism includes a projection that extends from the push rod and a ramp section on the end of the sleeve. Rotation of the sleeve moves the ramp with respect to the projection on the push rod to change the linear dimension of the return spring when the plunger attached to the push rod is against a stop. This change in length of the return spring creates a corresponding change in the force acting on the push rod to hold the plunger against the stop. When an operator desires to effect a brake application this new force of the spring must be overcome before the plunger moves to operate the control valve.

In a secondary embodiment, this adjustment of the length of the spring is achieved by an operator through a cable arrangement located on the dash of the vehicles. Movement of the cable causes a member to move with respect to a ramp and produce a corresponding change in the linear length of the spring. This change in spring length results in a change in spring force which allows the operator to match input force with a desired actuation input.

An advantage of the invention occurs since each operator can adjust the actuation force required to operate a control valve as a function of a change in loading of a vehicle.

It is an object of this invention to provide a linkage between a brake pedal and control valve with an adjustable return spring to permit an operator to select an input force required to initiate operation of a control valve. These advantages and objects should be apparent from reading this specification while viewing the drawings wherein:

FIG. 1 is a schematic illustration of a brake system with a sectional view of a linkage through which a brake pedal is connected to a control valve of a brake booster made according to the principles of the invention.

FIG. 2 is a sectional view taken along line 2—2 of FIG. 1 showing the adjustment mechanisms for changing the load on the return spring of the push rod;

DETAILED DESCRIPTION OF THE INVENTION

Figure 3:
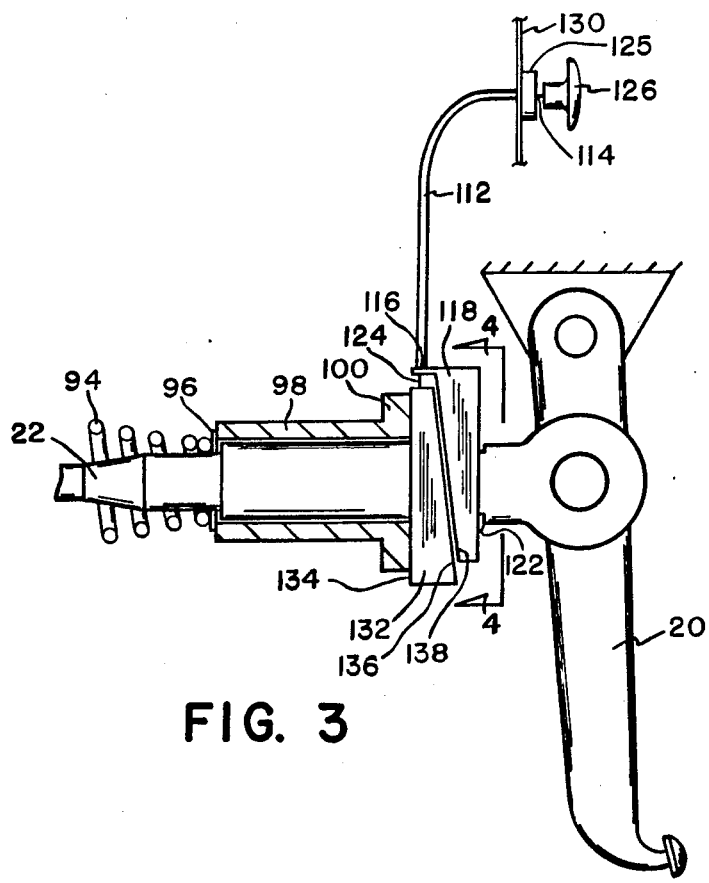
FIG. 3 is a schematic illustration of a secondary embodiment of the adjustment mechanisms of the invention.

In the brake system 10 shown in FIG. 1, a vacuum brake booster 12 is connected to a master cylinder 14. The brake booster 12 is attached to a firewall 16, of the vehicle by bolts 18, 18'. A brake pedal 20 connected to the brake booster 12 by a push rod 22 responds to an operator input to operate a control valve 24 to effect a brake application. The operator input required to initiate movement of a plunger 28 in the control valve 24 can be selected by the operator to match existing load condition in accordance with this invention.

In more particular detail, the vacuum brake booster 12 has a first shell 30 connected to a second shell 32 by a twist lock arrangement 34 to define a closed housing. A diaphragm 36 has a first bead 38 retained by the lock arrangement 34 and a second bead 40 that snaps into a groove 42 on hub 44 to hold a backing plate 46 against a ledge 48 on the hub 44. The diaphragm 36, backing plate 46, and hub 44 form a wall 37 which separates the interior of the closed housing into a front chamber 50 and a rear chamber 52. A return spring 54 located between shell 30 and hub 44 urges the wall 37 toward chamber 52 and against shell 32 in the rest position.

Hub 44 has an axial projection 58 that extends through shell 32. A stepped axial bore 56 extends through hub 44 and the axial projection 58. Hub 44 has a first passage 60 which connects chamber 50 with bore 56 and a second passage 62 which connects bore 56 with chamber 52.

The control valve 24 located in bore 56 in response to an input force acting on and moving plunger 28 located in the stepped bore 56 selectively allows air from the environment to be communicated to chamber 52.

Plunger 28 has a bearing surface 66 which slides on land 68 in hub 44 an annular flange 70 located in bore 56, and an air seat 64 which surrounds a socket 72. Ball 74 on the end of push rod 22 is located in socket 72. A stop member 76 located in a slot 78 adjacent passage 62 extends into bore 56 and limits the axial rearward movement of plunger 28 through engagement with annular flange 70.

A poppet 80 has a first bead 82 held in bore 56 by retainer 84 and an annular inner bead 86 which is free to move within bore 56. A poppet spring 88 located between retainer 84 and the inner bead 86 urges face 90 on the inner bead 86 toward vacuum slot 92 on hub 44 and air seat 64 on plunger 28.

Return spring 94 located in bore 56 has a first end fixed on retainer 84 and a second end that engages disc or washer 96 which surrounds push rod 22. A sleeve 98 which surrounds push rod 22 has a first end with an annular flange 100 that engages radial projections 102, 102' on push rod 22 and a second end that engages disc 96.

As best seen in FIG. 2, radial flange 100 has stepped ramp 104, 104' through which sleeve 98 is connected to push rod projections 102, 102'.

A boot 128 has a first end connected to shell 32 and a second end connected to a flange 109 on push rod 22. Boot 128 and filter 111 protect projection 58 for exposure to the containments such as dust, that could destroy seal 110.

MODE OF OPERATION OF THE INVENTION

In the design of a brake booster 12, the valve return spring 94 is selected to hold flange 70 on plunger 28 against stop 76. At the same time, air seat 64 engages face 90 to move face 90 away from seat 92 on hub 44 and seal aperture 91 in the inner bead 86. In this condition, vacuum present in chamber 50 freely evacuates air present in chamber 52 to allow wall return spring 54 to move wall 37 toward and into engagement with shell 32. Before plunger 28 moves in response to an input force applied to pedal 29, the resistance of return spring 94 must be overcome. As best seen in FIG. 2, the relationship of annular projections 102, 102' on ramp 104, 104' give a visual indication that input force required to operate vacuum brake booster 12 is set to operate within designed standards.

In response to an input force applied to pedal 20, push rod 22 moves plunger 28 by overcoming the force of return spring 94. When this force is overcome, plunger 28 moves away from stop 76. At the same time, spring 88 retains the free end of inner bead 86 on poppet 80 on air seat 64 until face 90 engages vacuum seat 92 on hub 44. On engagement of face 90 with seat 92, vacuum communication through passage 60 terminates. Thereafter, further movement of plunger 28 moves seat 64 away from face 90 to allow air to flow through aperture 91 into segment 57 of bore 56 and out passage 62 to chamber 52.

With air in chamber 52 and vacuum in chamber 50, a pressure differential is created across wall 37. This pressure differential acts on wall 37 and develops a force which is transferred into hub 44 by way of backing plate 46 acting on ledge 48. This force is carried through reaction disc 108 to output push rod 110 to provide master cylinder 14 with a force to pressurized fluid therein. Master cylinder 14 is of the type fully disclosed in U.S. Patent RE 31080. Pressurized hydraulic fluid from master cylinder 14 is communicated through conduit 112 to the front wheel brakes 114 and through conduit 116 to rear wheel brakes 118.

Reaction force from the output push rod 110 is carried back through disc 108 and acts on face 29 of plunger 28. When the reaction force exceeds the input force applied to push rod 22, plunger 28 moves toward face 90 on the inner bead 86 and air seat 64 engages face 90 to interrupt the flow of air to chamber 52.

On termination of the input force on push rod 22, return spring 94 acts on and moves push rod 22 to bring flange 70 on plunger 28 against stop 76. As plunger 28 moves toward stop 76, seat 64 acts on and moves face 90 away on inner bead 86 from seat vacuum 92 to reestablish vacuum communication between chamber 50 and 52. As air is evacuated from chamber 52, return spring 54 moves wall 47 toward and into engagement with shell 32.

Since people's preferences differ it is desirable to select the force required to initiate a brake application to a driver's preference. To change the input force requirement, sleeve 98 is rotated to move projection 102, 102' with respect to ramp 104, 104' and change the linear dimension between the first and second ends of return spring 94. By changing the tension in spring 94 a corresponding change occurs in the input force. Thus, an operator can match the input force with the force that feels best to the operator for initiating a brake application.

Figure 4:
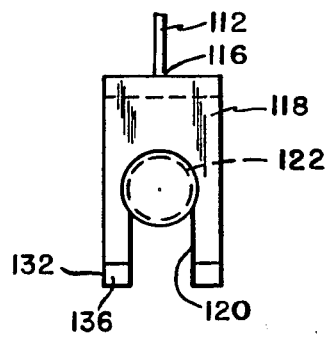
FIG. 4 is a sectional view taken along line 4—4 of FIG. 3.

In the embodiment shown in FIG. 3, the adjustment is achieved through the use of a cable 112 which has a first end 114 secured to a stationary member such as a dash 130 of a vehicle and a second end 116 connected to member 118 located on push rod 22. Member 118 is rectangular and has a slot 120, see FIG. 4, which is located in a corresponding flat 122 in push rod 22. A wire 124 located on the inside of cable 112 is connected to a handle 126 on dash 130 and a movable member 132 on push rod 22. Member 132 which is rectangular, has a first surface 134 which is planar and engages flange 100 on sleeve 98 and a second surface 136 which has a tapered or wedge shape. Surface 136 engages a corresponding tapered or wedge surface 138 on member 118. Depending on the input force that an operator would desire to experience when a force is applied to pedal 20, handle 126 would be moved and locked by clamp or nut 125. Movement or wire 124 either pushes or pulls member 132 with respect to member 118 to allow sleeve 98 to move and thereby change the length of spring 94. Thus, when an operator desires to change pedal feel associated with a brake application movement of handle 126, to either increase or decrease the tension on spring 94 changes the reaction force required to overcome spring 94 to accomplish this goal.

I claim:

1. In a vacuum brake booster operated by an input force applied to a brake pedal by an operator, said input force operating a control valve located in a bore of a hub member carried by a movable wall, said control member allowing an operational fluid to be presented to the brake booster to develop an output force corresponding to said input force, the improvement in a linkage connecting said brake pedal with said control valve comprising:
   a push rod connecting said brake pedal with said control valve;
   a sleeve surrounding a portion of said push rod, said sleeve having a first end and a second end;
   a resilient member having a first end connected to said hub and a second end connected to said second end of said sleeve;
   a washer located between said second end of said resilient member and said second end of said sleeve to uniformly transfer the force of said resilient member into said sleeve;
   a plurality of radial projections through which the force from said resilient member is transferred into said push rod; and
   adjustment means through which said first end of said sleeve is connected to said push rod for urging said control valve against a stop, said adjustment means allowing the operator to change the load on said resilient means and thereby select an input force to initiate the operation of the control valve.

2. In the vacuum brake booster as recited in claim 1, wherein said adjustment means includes:
   a ramp located on said first end of said sleeve said resilient member urging said ramp into engagement with said radial projections, said sleeve being rotated to move said ramp with respect to said radial projections to change the linear dimension between said first and second ends of said resilient member with said control valve in engagement with said stop.

3. In the vacuum brake booster as recited in claim 2 wherein said ramp includes:
  detents to prevent said sleeve from rotating once an operator has selected a desired linear dimension for said resilient member.

4. In a vacuum brake booster operated by an input force applied to a brake pedal by an operator, said input force operating a control valve located in a bore of a hub member carried by a movable wall, said control member allowing an operational fluid to be presented to the brake booster to develop an output force corresponding to said input force, the improvement in a linkage connecting said brake pedal with said control valve comprising:
  a push rod connecting said brake pedal with said control valve;
  a sleeve surrounding a portion of said push rod, said sleeve having a first end and a second end;
  a resilient member having a first end connected to said hub and a second end connected to said second end of said sleeve;
  a washer located between said second end of said resilient member and said second end of said sleeve to uniformly transfer the force of said resilient member into said sleeve;
  a first member fixed to said push rod and having a first tapered surface thereon;
  a second member located between said first end of said sleeve and said first member; and
  adjustment means for moving said second member with respect to said tapered surface to change the linear dimension between said first and second ends of said resilient member to change the force which is transferred from said first end of said sleeve into said push rod to urge said control valve against a stop, said adjustment means allowing the operator to change the load on said resilient means and thereby select a desired input force for initiating the operation of the control valve.

5. In the vacuum brake booster, as recited in claim 4 wherein said adjustment means further includes:
  a cable housing having a first end connected to a stationary support and a second end connected to said first member;
  a wire located in said cable housing having a first end extending from said stationary support and a second end connected to said second member; and
  clamp means located on said stationary support, said clamp holding said wire in a fixed position after an operator has selected a position of said second member with respect to said first member.

* * * * *